United States Patent
Wiessmann

(10) Patent No.: US 11,837,947 B2
(45) Date of Patent: Dec. 5, 2023

(54) SELF-COMMUTATED INVERTER AND OPERATION OF SAME

(71) Applicant: Siemens Aktiengesellschaft, Munich (DE)

(72) Inventor: Harald Wiessmann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 17/312,313

(22) PCT Filed: Nov. 25, 2019

(86) PCT No.: PCT/EP2019/082406
§ 371 (c)(1),
(2) Date: Jun. 9, 2021

(87) PCT Pub. No.: WO2020/120116
PCT Pub. Date: Jun. 18, 2020

(65) Prior Publication Data
US 2022/0029525 A1  Jan. 27, 2022
US 2022/0190709 A2  Jun. 16, 2022

(30) Foreign Application Priority Data

Dec. 10, 2018 (EP) .................................... 18211267

(51) Int. Cl.
*H02M 1/12* (2006.01)
*H02M 7/5387* (2007.01)
*H02P 27/06* (2006.01)

(52) U.S. Cl.
CPC ......... *H02M 1/123* (2021.05); *H02M 7/5387* (2013.01); *H02P 27/06* (2013.01)

(58) Field of Classification Search
CPC ...... H02M 1/12; H02M 1/123; H02M 7/5387; H02M 7/53873; H02P 27/06
See application file for complete search history.

(56) References Cited

U.S. PATENT DOCUMENTS

| 2013/0329471 A1 | 12/2013 | Escobar et al. |
| 2016/0156291 A1 | 6/2016 | Becker |
| 2021/0203251 A1* | 7/2021 | Benesch ........... H02M 7/53875 |

FOREIGN PATENT DOCUMENTS

| CH | 711566 A2 | 3/2017 |
| CN | 105553309 A | 5/2016 |

(Continued)

OTHER PUBLICATIONS

PCT International Search Report and Written Opinion of International Searching Authority dated Feb. 22, 2021 corresponding to PCT International Application No. PCT//EP2019/082406 filed Dec. 10, 2018.

*Primary Examiner* — Adolf D Berhane
(74) *Attorney, Agent, or Firm* — Henry M. Feiereisen LLC

(57) ABSTRACT

In a method for operating a self-commutated inverter, a direct voltage is supplied from a direct voltage circuit to electronic switches, which are controlled in an open-loop manner by space vector modulation, for generating a three-phase output voltage. The three-phase output voltage is supplied to a three-phase output filter arranged downstream of the electronic switches and coupled to the direct voltage circuit, allowing common mode portions of filter input currents of the output filter to flow into the direct voltage circuit. Filter output currents of the three-phase output filter are controlled in a closed-loop manner, and a zero-system voltage of the filter input voltages of the output filter is controlled in a closed loop manner as a function of a target voltage space vector of the space vector modulation and as a function of the filter input currents to suppress oscillations in a zero system of the filter input currents.

13 Claims, 2 Drawing Sheets

(56) References Cited

FOREIGN PATENT DOCUMENTS

| CN | 106788118 A | 5/2017 |
|---|---|---|
| EP | 3058646 A1 | 8/2016 |

\* cited by examiner

SELF-COMMUTATED INVERTER AND OPERATION OF SAME

CROSS-REFERENCES TO RELATED APPLICATIONS

This application is the U.S. National Stage of International Application No. PCT/EP2019/082406, filed Nov. 25, 2019, which designated the United States and has been published as International Publication No. WO 2020/120116 A1 and which claims the priority of European Patent Application, Serial No. 18211267.2, filed Dec. 10, 2018, pursuant to 35 U.S.C. 119(a)-(d).

BACKGROUND OF THE INVENTION

The invention relates to a self-commutated inverter which is supplied from a direct voltage circuit and has electronic switches for producing a three-phase output voltage and a three-phase output filter which is connected downstream of the electronic switches and is coupled to the direct voltage circuit.

Self-commutated inverters, in particular rapidly switching inverters, frequently have an output filter, in order to delimit high voltage gradients which occur during switching and/or to enable shielded lines to be omitted. One special variant of an output filter couples interferences back to a direct voltage circuit which supplies the inverter.

Output filters of inverters frequently have a pronounced resonance frequency. In order to obtain the highest possible damping in the region of a switching frequency of the inverter and its multiples, the components of an output filter are typically selected so that the resonance frequency of the output filter is located in the region between a maximum fundamental oscillation output frequency and the switching frequency. Filter output currents of the output filter can be used for closed-loop current control. The use of the filter output currents can advantageously influence the behavior of the closed-loop current control in relation to a use of the filter input currents of the output filter.

By linking the output filter to the direct voltage circuit, parts of the filter input currents of the output filter can also flow directly into the direct voltage circuit. These so-called common mode currents are not detected by a closed-loop current control on the output side and can therefore also not be adjusted. A conventional dq closed-loop current control with a current measurement downstream of the inverter would also not detect these currents. If the currents are considered after a dq0 transformation, in addition to the actual d- and q-components in this constellation a significant zero-phase-sequence system component also exists. The resonance frequency of the output filter is also visible in the common mode circuit and results in oscillations of the filter input currents, which load the filter components of the output filter and the electronic switches of the inverter.

An output filter coupled to the direct voltage circuit therefore requires measures for damping these oscillations. One approach is to introduce damping resistors in order to reduce the amplitude peaks in the region of the resonance frequency. These damping resistors nevertheless require additional installation space and produce losses which have to be discharged.

In addition, active electronic circuits can also be used in order to dampen oscillations. This alternative is very complicated, however. One further solution for circumventing this problem is the change in the filter topology. If the connection to the direct voltage circuit is separated, for instance, common mode currents can in principle no longer flow, but the filter effect for common mode interferences is also lost, however. By using additional components, for instance a common mode inductor or additional capacitors, the filter transmission function can be embodied differently for common mode and what are known as differential mode signals and as a result resonance oscillations in the common mode system can likewise be reduced. However, this solution also requires additional components and additional installation space.

US 2016/0156291 A1 discloses a bidirectional high frequency drive, which is designed to connect a supply network and an electric machine. The high frequency drive comprises inductors, which are configured in each case for connection with respective phase outputs of the electric machine, circuit breakers, which are connected to the inductors, and a controller, which is connected to the circuit breakers and generates control signals on the basis of an operating state and a predetermined operating state of the electric machine.

CN 105 553 309 A discloses a three-level inverter of the T type and a method for controlling its center point voltage in an open-loop manner. With the inverter, a connection point of an upper bus capacitance and a lower bus capacitance is short-circuited on a direct current side of the inverter with a neutral line of an alternating current side. The method for controlling the center point voltage in an open-loop manner is based on a dq axes decoupling controller.

EP 3 058 646 A1 discloses a method for controlling a power converter, which is connected to an electrical load or an electrical energy source by way of a filter, in an open loop manner. With the method, output signals are determined, which comprise currents and/or voltages measured in the filter. At least one of the output signals is filtered algorithmically by applying a signal filter to the output signal, in order to amplify the output signal in the case of a resonance frequency of the filter.

The object underlying the invention is to suppress oscillations of filter input currents in a self-commutated inverter with an output filter, which is coupled to a direct voltage circuit supplying the inverter, without using additional components.

SUMMARY OF THE INVENTION

The object is achieved according to the invention by a method as set forth hereinafter, and by a self-commutated inverter as set forth hereinafter.

Advantageous embodiments of the invention are the subject matter of the dependent claims.

With the inventive method for operating a self-commutated inverter, which is supplied from a direct voltage circuit and has electronic switches for generating a three-phase output voltage and a three-phase output filter which is connected downstream of the electronic switches and is coupled to the direct voltage circuit, the electronic switches are controlled in an open-loop manner by space-vector modulation, in which a zero-phase-sequence system voltage is controlled in a closed-loop manner by filter-input voltages of the output filter as a function of a target-voltage space vector of the space-vector modulation and filter input currents of the output filter such that oscillations in a zero-phase sequence system of the filter input currents are suppressed.

The invention therefore provides to suppress in a targeted manner oscillations in a zero-phase-sequence system of the filter input currents of the output filter by modifying a space-vector modulation, with which the electronic switches are activated. With the use of a conventional space vector modulation, a zero-phase-sequence system in the phases of the inverter voltage changes as a function of the degree of modulation and the angular position of the voltage. The changes to the zero-phase-sequence system result in common-mode excitations of the output filter and oscillations of the filter input currents. By means of a targeted influencing of the zero-phase-sequence system voltage of the filter input voltages of the output filter by modifying the space-vector modulation, oscillations can therefore be suppressed in a zero-phase-sequence system of the filter input currents. By means of the inventive method, oscillations of the filter input currents and therefore loads of the output filter and the electronic switches of the inverter are reduced, without further passive components, for instance damping resistors, additional inductors or capacitors or active electronic circuits being used.

One embodiment of the invention provides that the zero-phase-sequence system voltage of the filter input voltages is controlled in a closed loop manner by a zero-phase-sequence system shift, which defines a duration ratio of durations, in which one of the zero-phase-sequence voltage space vectors is applied in each case during a clock period of the space vector modulation. This embodiment of the invention takes advantage of the fact that there are a number of zero-phase-sequence voltage space vectors and the zero-phase-sequence system voltage of the filter input voltages can be influenced by the duration ratio of the durations, in which one of the zero-phase-sequence system voltage space vectors is applied during a clock period of the space vector modulation in each case.

A further shaping of the afore-cited embodiment of the invention provides that the zero-phase-sequence shift has two shift portions, wherein a first shift portion is determined as a function of the target voltage space vector of the space vector modulation and the second shift portion is formed as a function of the filter input currents of the output filter. For instance, the zero-phase-sequence system shift is formed by adding the two shift portions. The first shift portion defines for instance a duration ratio with which the target voltage space vector can be realized without a zero-phase-sequence system. A zero-phase-sequence system voltage of the filter input voltages is effected by the second shift portion, which dampens oscillations in the zero-phase-sequence system of the filter input currents. The second shift portion is determined for instance by means of a P controller as a function of a total current which is formed from the filter input currents of the output filter. For instance, the filter input currents of the output filter are measured and the total current is formed by adding the measured filter input currents.

The afore-cited embodiments of the invention enable excitations of common mode oscillations to be avoided as much as possible by the first shift portion of the zero-phase-sequence system shift and oscillations in the filter input currents to be dampened by the second shift portion. Avoiding excitations of common mode oscillations by means of a zero-phase-sequence system-free realization of the target voltage space vector is especially possible with relatively small degrees of modulation, in other words with small ratios of the target voltage in relation to the direct voltage of the direct voltage circuit. A zero-phase-sequence system-adjusted space vector modulation of this type is however not effective with higher degrees of modulation and cannot dampen slowly decaying oscillations in the zero-phase-sequence system of the filter input currents. The second shift portion of the zero-phase-sequence system shift, which depends on the filter input currents and dampens oscillations in the zero-phase-sequence system of the filter input currents by means of a zero-phase sequence system which counteracts the oscillations, is used to dampen these oscillations.

A further embodiment of the invention provides that the target voltage space vector of the space vector modulation is formed as a function of filter output currents of the output filter. The invention provides that the space vector modulation controls the filter output currents in a closed-loop manner and in the process simultaneously suppresses oscillations in a zero-phase-sequence system of the filter input currents.

An inventive self-commutated inverter is supplied from a direct voltage circuit and comprises electronic switches for producing a three-phase output voltage, a three-phase output filter which is connected downstream of the electronic switches and is coupled to the direct voltage circuit, and a control unit. The control unit is designed to activate the electronic switches with a space vector modulation, in which a zero-phase-sequence system voltage is controlled in a closed-loop manner by filter input voltages of the output filter as a function of a target voltage space vector of the space vector modulation and filter input currents of the output filter so that oscillations in a zero-phase-sequence system of the filter input currents are suppressed. The inverter can be embodied in a two-level or multi-level topology. The advantages of an inventive inverter correspond to the advantages of the inventive method already cited above.

Embodiments of the inventive inverter correspond to embodiments of the inventive method.

In particular, one embodiment of the inventive inverter provides that the control unit is designed to control the zero-phase-sequence system voltage of the filter input voltages in a closed-loop manner by means of a zero-phase-sequence system shift, which defines a duration ratio of durations, in which one of the zero-phase-sequence voltage space vectors is applied in each case during a clock period of the space vector modulation. For instance, the control unit has a space vector modulator, which is designed to determine a first shift portion of the zero-phase-sequence system shift as a function of the target voltage space vector of the space vector modulation. Furthermore, the control unit has a P-controller, for instance, which is designed to form a second shift portion of the zero-phase-sequence system shift as a function of a total current, which is formed from the filter input currents of the output filter.

One further embodiment of the inventive inverter provides that the control unit is embodied to form a target voltage space vector of the space vector modulation as a function of filter output currents of the output filter.

A further embodiment of the inventive inverter provides a first measuring apparatus for measuring the filter input currents and/or a second measuring apparatus for measuring filter output currents of the output filter.

BRIEF DESCRIPTION OF THE DRAWING

The above-described characteristics, features and advantages of this invention, as well as the manner in which these are realized will become more clearly and easily intelligible in connection with the following description of exemplary embodiments which are explained in more detail with reference to the drawings, in which.

DETAILED DESCRIPTION OF PREFERRED EMBODIMENTS

Figure 1:
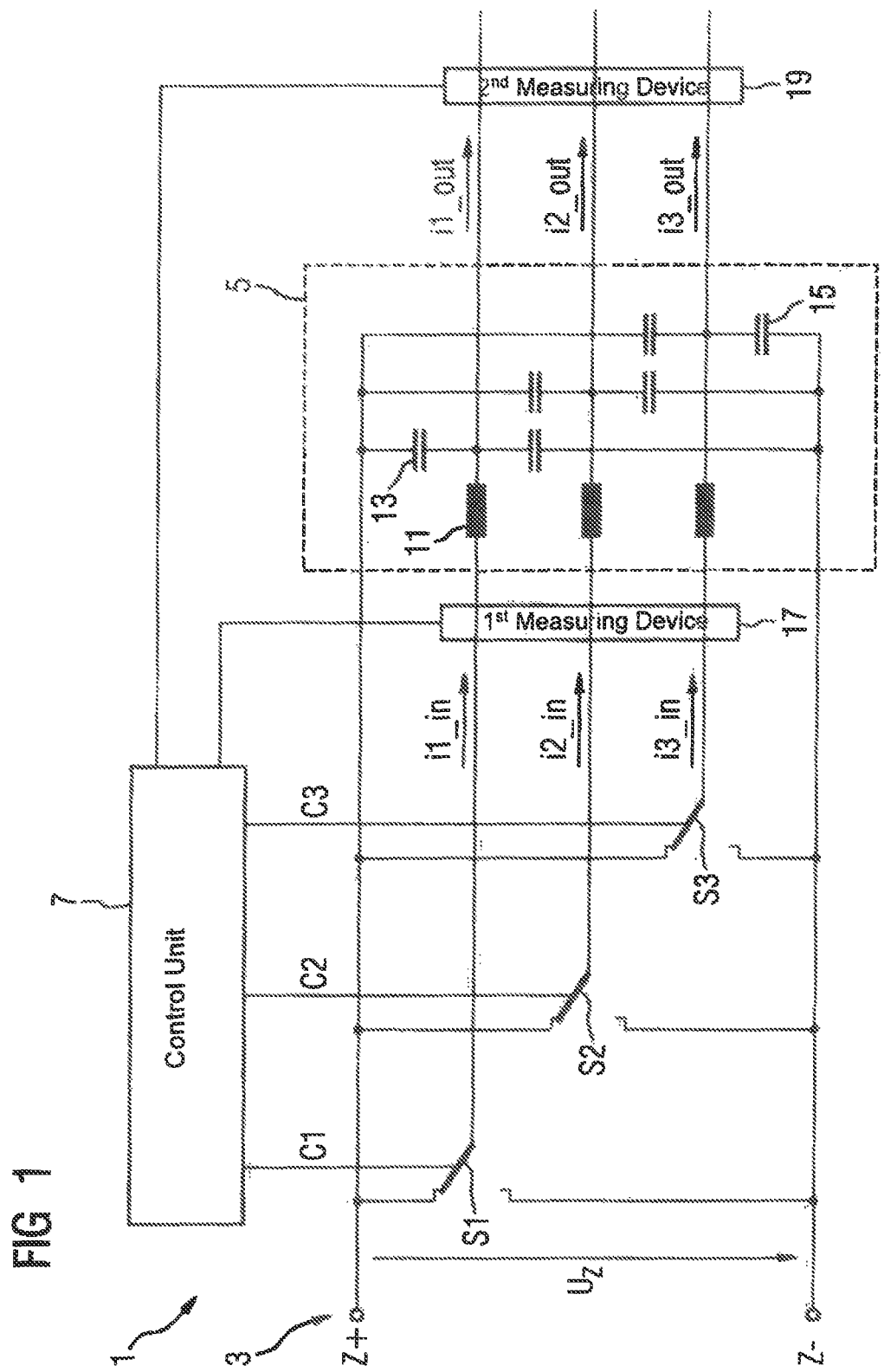
FIG. 1 shows a circuit diagram of a self-commutated inverter.

Parts which correspond to one another are provided with the same reference characters in the figures.

FIG. 1 shows a circuit diagram of a self-commutated inverter 1. The inverter 1 is supplied from a direct voltage circuit 3. The inverter 1 has electronic switches S1, S2, S3 for generating a three-phase output voltage, a three-phase output filter 5 and a control unit 7 for closed-loop current control. The inverter 1 and the direct voltage circuit 3 can be components of a converter, which also has a rectifier, which is connected to the inverter 1 by way of the direct voltage circuit 3.

Each electronic switch S1, S2, S3 switches a phase of the output voltage of the inverter 1 and has a first switching state, in which it sets the phase onto a first direct voltage potential Z+ of the direct voltage circuit 3, and a second switching state, in which the phase is set onto a second direct voltage potential Z− of the direct voltage circuit 3. The potential difference between the direct voltage potentials Z+, Z− is a direct voltage $U_Z$ of the direct voltage circuit 3. The electronic switches S1, S2, S3 are only shown schematically in FIG. 1 and formed in each case for instance as a half-bridge with two semiconductor switches 9. Each semiconductor switch 9 is embodied for instance as an IGBT (bipolar transistor with insulated gate electrode) or as a MOSFET (metal oxide semiconductor field effect transistor).

The output filter 5 is arranged downstream of the electronic switches S1, S2, S3 and has a filter inductor 11 and two filter capacitors 13, 15 for each phase of the output voltage. The filter inductor 11 of a phase is connected to the electronic switch S1, S2, S3 of this phase. The output filter 5 is connected to the direct voltage circuit 3 by way of the filter capacitors 13, 15. A first filter capacitor 13 of each phase is connected with the first direct voltage potential Z+ of the direct voltage circuit 3 and the second filter capacitor 15 of each phase is connected to the second direct voltage potential Z− of the direct voltage circuit 3.

A filter input current i1_in, i2_in, i1_in of this phase flows between the electronic switch S1, S2, S3 of one phase and the output filter 5. Filter output currents i1_out, i2_out, i3_out which form an output current of the inverter 1 for one phase in each case, flow behind the output filter 5, in other words on the output side. Common mode currents of the output filter 5 can flow by way of the filter capacitors 13, 15.

The control unit 7 controls the electronic switches S1, S2, S3 with activation signals C1, C2, C3. The activation signals C1, C2, C3 are formed by the control unit 7 with a space vector modulation, in which, in a manner described in more detail below, a zero-phase-sequence system voltage of filter input voltages of the output filter 5 is controlled in a closed-loop manner as a function of a target voltage space vector $u_{\alpha,\beta\_s}$ of the space vector modulation and the filter input currents i1_in, i2_in, i3_in so that oscillations in a zero-phase-sequence system of the filter input currents i1_in, i2_in, i3_in are suppressed, wherein the target voltage space vector $u_{\alpha,\beta\_s}$ is formed as a function of the filter output currents i1_out, i2_out, i3_out. The filter input currents i1_in, i2_in, i3_in are detected by means of a first measuring apparatus 17. The filter output currents i1_out, i2_out, i3_out are detected by means of a second measuring apparatus 19.

Figure 2:
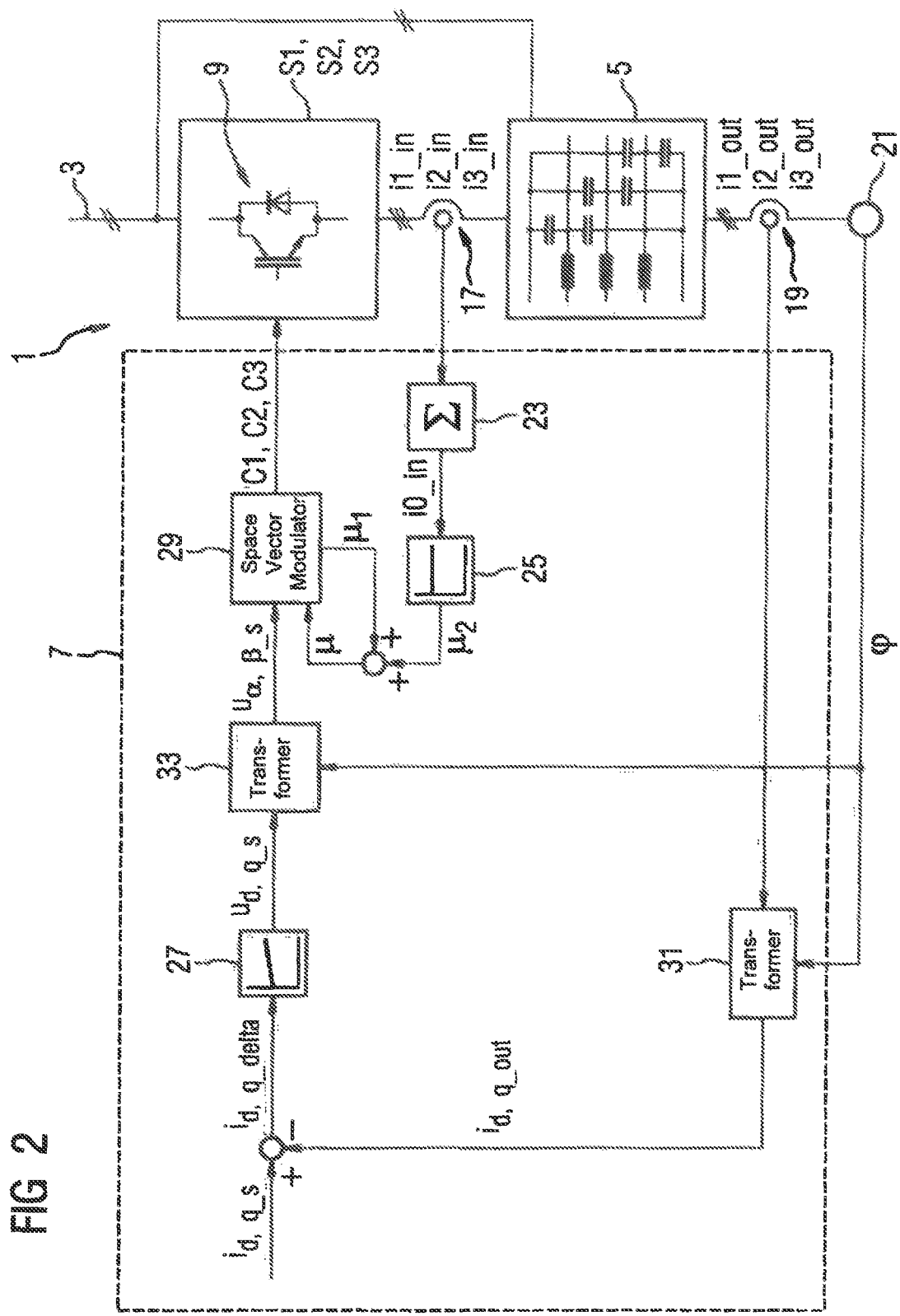
FIG. 2 shows a block diagram of a self-commutated inverter.

FIG. 2 shows a block diagram of the inverter 1 shown in FIG. 1, wherein the output of the inverter 1 is connected to a three-phase electric motor 21, so that the filter output currents i1_out, i2_out, i3_out of the inverter 1 are the motor currents of the electric motor 21. The electric motor 21 is embodied as a rotating electric machine with a rotor and a stator and has an angular position sensor, which detects a rotor angle φ, which specifies a position of the rotor in relation to the stator. Alternatively, the electric motor 21 can also be embodied as a linear motor with a stator and a rotor which can be moved linearly in relation to the stator, and have a position sensor, which specifies a rotor position of the rotor in relation to the stator. The rotor position then appears at the position of the rotor angle φ.

The control unit 7 is designed to carry out the inventive method described below. To this end, the control unit 7 has an adder 23, a P controller 25, a PI controller 27, a space vector modulator 29 and two transformers 31, 33.

The actual values of the filter output currents i1_out, i2_out, i3_out detected by the second measuring apparatus 19 and the actual value of the rotor angle φ are supplied to a first transformer 31. The first transformer 31 determines an actual current space vector $i_{d,q\_out}$ of the filter output currents i1_out, i2_out, i3_out in a dq coordinate system rotating with the rotor from these actual values by means of a dq transformation.

A differential current space vector $i_{d,q\_delta}$ is formed from the actual current space vector $i_{d,q\_out}$ and a target current space vector $i_{d,q\_s}$, by the actual current space vector $i_{d,q\_out}$ being subtracted from the target current space vector $i_{d,q\_s}$. The differential current space vector $i_{d,q\_delta}$ is the control deviation of the closed-loop current control of the filter output currents i1_out, i2_out, i3_out.

A dq target voltage space vector $u_{d,q\_s}$ is formed by the PI controller 27 from the differential space vector $i_{d,q\_delta}$, and describes a target voltage of the inverter 1, in a dq coordinate system, which counteracts the control deviation.

A target voltage space vector $u_{\alpha,\beta\_s}$ for the space vector modulation is formed by the second transformer 33 from the dq target voltage space vector $u_{d,q\_s}$, by the dq target voltage space vector $u_{d,q\_s}$ being transformed into a stator-fixed αβ coordinate system by using the rotor angle φ.

The space vector modulator 29 generates the activation signals C1, C2, C3, with which the electronic switches S1, S2, S3 are activated, from the target voltage space vector $u_{\alpha,\beta\_s}$ and a zero-phase-sequence system shift μ. The zero-phase-sequence system shift μ defines a duration ratio of durations, in which one of the zero-phase-sequence voltage space vectors is applied during a clock period of the space vector modulation in each case. In the case of two zero-phase-sequence voltage space vectors, the zero-phase-sequence system shift μ therefore defines the quotients of a first duration, for instance, in which a first zero-phase-sequence voltage space vector is applied during a clock period, and a second duration, in which the second zero-phase-sequence voltage space vector is applied during the clock period.

The zero-phase-sequence system shift μ is additionally formed according to $\mu=\mu_1+\mu_2$ from two shift portions $\mu_1$, $\mu_2$. A first shift portion $\mu_1$ is formed by the space vector modulator 29 as a function of the target voltage space vector $u_{\alpha,\beta\_s}$, defines a duration ratio, with which the target voltage space vector $u_{\alpha,\beta\_s}$ can be realized free of a zero-phase-sequence system.

The second shift part $\mu_2$ is formed by the adder 23 and the P controller 25 as a function of the filter input currents i1_in, i2_in, i3_in so that it effects a zero-phase-sequence system voltage of the filter input voltages, dampens the oscillations in the zero-phase-sequence system of the filter input currents i1_in, i2_in, i3_in. To this end, the actual values of the filter input currents i1_in, i2_in, i3_in detected by the first measuring apparatus 17 are added by the adder 23 to form a total current i0_in. The second shift portion is determined from the total current i0_in by the P controller 25.

Instead of measuring the filter input currents i1_in, i2_in, i3_in and the filter output currents i1_out, i2_out, i3_out with measuring apparatuses 17 and 19, provision can also be made to measure only the filter input currents and to calculate the filter output currents i1_out, i2_out, i3_out. Alternatively, provision can be made to measure only the filter output currents i1_out, i2_out, i3_out and to calculate the filter input currents i1_in, i2_in, i3_in.

Although the invention has been illustrated and described in detail based on preferred exemplary embodiments, the invention is not restricted by the examples given and other variations can be derived therefrom by a person skilled in the art without departing from the protective scope of the invention.

What is claimed is:

1. A method for operating a self-commutated inverter, comprising:
   supplying a direct voltage from a direct voltage circuit to electronic switches, which are controlled in an open-loop manner by space vector modulation, for generating a three-phase output voltage;
   supplying the three-phase output voltage to a three-phase output filter arranged downstream of the electronic switches and coupled to the direct voltage circuit, allowing common mode portions of filter input currents of the output filter to flow into the direct voltage circuit;
   controlling filter output currents of the three-phase output filter in a closed-loop manner,
   controlling a zero-system voltage of the filter input voltages of the output filter in a closed loop manner as a function of a target voltage space vector of the space vector modulation and as a function of the filter input currents of the output filter so as to suppress oscillations in a zero system of the filter input currents; and
   controlling the zero-system voltage of the filter input voltages in a closed-loop manner by a zero-system shift, which defines a ratio of durations, in which during a clock period of the space vector modulation one of the zero voltage space vectors is applied.

2. The method of claim 1, wherein the zero-system shift comprises two shift portions, with a first shift portion being determined as a function of the target voltage space vector and the second shift portion being formed as a function of the filter input currents.

3. The method of claim 2, wherein the zero-system shift is formed by adding the first and the second shift portions.

4. The method of claim 2, wherein the first shift portion defines a duration ratio capable of realizing the target voltage space vector zero-system-free.

5. The method of claim 2, wherein the second shift portion causes a zero-system voltage of the filter input voltages which dampens oscillations in the zero system of the filter input currents.

6. The method of claim 2, further comprising forming the second shift portion by means of a P controller as a function of a total current formed from the filter input currents.

7. The method of claim 6, further comprising measuring the filter input currents and forming the total current by adding the measured filter input currents.

8. The method of claim 1, wherein the target voltage space vector is formed as a function of the filter output currents.

9. A self-commutated inverter, comprising:
   electronic switches connected to a direct voltage circuit for generating a three-phase output voltage,
   a three-phase output filter arranged downstream of the electronic switches and coupled to the direct voltage circuit so as to allow common mode portions of filter input currents of the three-phase output filter to flow into the direct voltage circuit, and
   a control unit controlling the electronic switches by way of space vector modulation, the control unit configured to control filter output currents of the three-phase output filter in a closed-loop manner and to control a zero-system voltage of filter input voltages of the output filter in a closed-loop manner as a function of a target voltage space vector of the space vector modulation and as a function of the filter input currents so as to suppress oscillations in a zero system of the filter input currents, wherein the control unit is configured to control the zero-system voltage of the filter input voltages by means of a zero-system shift, which defines a ratio of durations, in which during a clock period of the space vector modulation one of the zero voltage space vectors is applied.

10. The inverter of claim 9, wherein the control unit comprises a space vector modulator, which is designed to determine a first shift portion of the zero-system shift as a function of the target voltage space vector.

11. The inverter of claim 9, wherein the control unit comprises a P controller, which is configured to form a second shift portion of the zero-system shift as a function of a total current formed from the filter input currents.

12. The inverter of claim 9, wherein the control unit is configured to form the target voltage space vector as a function of the filter output currents.

13. A self-commutated inverter, comprising:
   electronic switches connected to a direct voltage circuit for generating a three-phase output voltage,
   a three-phase output filter arranged downstream of the electronic switches and coupled to the direct voltage circuit so as to allow common mode portions of filter input currents of the three-phase output filter to flow into the direct voltage circuit,
   a control unit controlling the electronic switches by way of space vector modulation, the control unit configured to control filter output currents of the three-phase output filter in a closed-loop manner and to control a zero-system voltage of filter input voltages of the output filter in a closed-loop manner as a function of a target voltage space vector of the space vector modulation and as a function of the filter input currents so as to suppress oscillations in a zero system of the filter input currents; and
   at least one of a first measuring apparatus for measuring the filter input currents and a second measuring apparatus for measuring the filter output currents.

* * * * *